Patented May 2, 1950

2,505,837

UNITED STATES PATENT OFFICE 2,505,837

4-BROMO-3,11-DIKETO-17(α)-HYDROXY-20-ACYLOXYPREGNANES AND PROCESS

Lewis H. Sarett, Princeton, N. J., assignor to Merck & Co., Inc., Rahway, N. J., a corporation of New Jersey No Drawing. Application June 1, 1946, Serial No. 673,890

6 Claims. (Cl. 260—397.4)

This invention is concerned generally with novel chemical compounds of the cyclopentanodimethyl polyhydrophenanthrene series and processes of preparing the same; more particularly it relates to stereoisomers of 4-bromo-3,11-diketo-17-hydroxy-20-acyloxy pregnane and with methods of manufacturing these compounds from readily available starting material. The new compounds thus produced are of value in the preparation of hormones showing an androgenic activity, such as adrenosterone. They are also of value as a means of establishing the structure of other organic compounds.

These stereoisomeric 4-bromo-3,11-diketo-17-hydroxy-20-acyloxy pregnanes can be represented by the following structural formula:

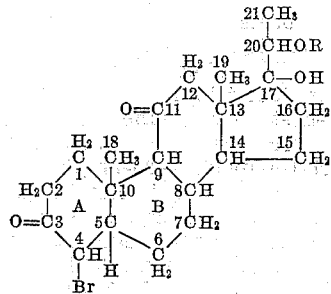

wherein R is acyl. This formula, for purposes of convenience, is hereinafter reproduced below in the abbreviated form:

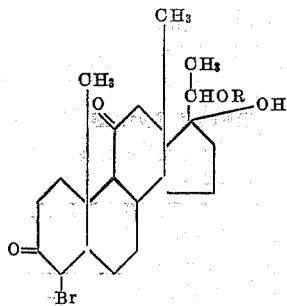

wherein R has the significance above defined.

In the following description of the invention, the stereochemical relationships of the substituents are indicated by the following convention:

(1) The stereochemical relationships of rings A and B is indicated in the formula by a solid line representing the valence bond in the cis configuration.

(2) A substituent in the $C_{17}$ position, the stereochemical configuration of which is identical with that of the naturally occurring adrenal hormones, is parenthetically designated "α". The epimeric configuration is designated "β". In the structural formula, the former configuration is shown by writing the $C_{17}$ substituent (hydroxyl) to the right of the $C_{17}$ carbon side chain thus:

in the latter case above the side chain thus:

In accordance with the present invention, it is now found that stereoisomers of 4-bromo-3,11-diketo-17-hydroxy-20-acyloxy pregnane can be synthesized by reactions designated generically as follows:

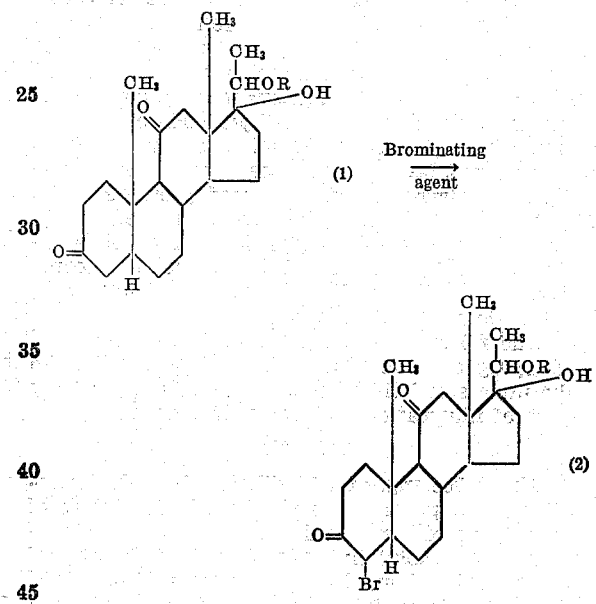

In the above formulae, R is an acyl radical.

The reactions indicated above are conducted as follows: The starting material, a stereoisomer of 3,11-diketo-17-hydroxy-20-acyloxy pregnane (1), which is prepared according to processes disclosed in my co-pending applications, Serial No. 605,194, filed July 14, 1945, now abandoned; Serial No. 687,982, filed August 2, 1946; and Serial No. 683,427, filed July 13, 1946, now Pat. No. 2,493,780, is reacted with a brominating agent to produce the corresponding stereoisomer of 4 - bromo - 3,11 - diketo-17-hydroxy-20-acyloxy pregnane (2).

In carrying out the presently invented process, a stereoisomer of 3,11-diketo-17-hydroxy-20-acyloxy pregnane as, for example, 3,11-diketo-17-(α)-hydroxy-20-acetoxy pregnane; 3,11-diketo-17-(α)-hydroxy-20-propionoxy pregnane; 3,11-diketo-17-(α)-hydroxy - 20 - butyroxy-pregnane; 3,11-diketo-17-(α)-hydroxy - 20 - benzoxy pregnane; 3,11-diketo - 17 - (β)-hydroxy-20-acetoxy pregnane or mixtures thereof, is reacted with a substantially equimolecular quantity of bromine and an inert solvent such as glacial acetic acid, the bromine entering the molecule at the 4-position to form the corresponding 4-bromo-3,11-diketo-17-hydroxy-20-acyloxy pregnane, which can be represented by the following structural formula:

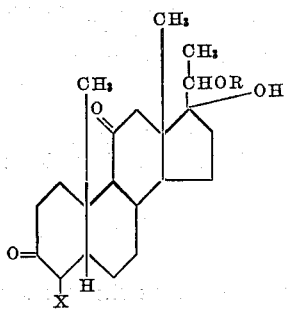

wherein R is acyl and X is halogen.

It is important not to use substantially more than an equimolecular quantity of halogen because an excess favors the formation of the dihalide.

In applicant's preferred procedure, wherein the 3,11-diketo-17-(α)-hydroxy-20-acyloxy pregnane is reacted with bromine in glacial acetic acid, the product is isolated as follows: The reaction product is dissolved in a water-immiscible solvent, such as ether, the solvent extract washed with a dilute alkaline aqueous solution containing an alkali or alkaline earth hydroxide or carbonate, whereby acidic materials are removed from the solvent layer which is separated and evaporated to dryness under reduced pressure. The product thus obtained is further purified, if desired, by recrystallization from an aliphatic alcohol, such as ethyl alcohol, to produce the corresponding 4-bromo-3,11-diketo- 17 -(α)-hydroxy-20-acyloxy pregnane.

The following examples illustrate methods of carrying out the present invention, but it is to be understood that these examples are given by way of illustration and not of limitation.

*Example I*

About 860 mg. of 3,11-diketo-17-(α)-hydroxy-20-acetoxy pregnane is dissolved in a mixture of about 3 cc. of acetic acid and about 3 cc. of chloroform and a solution containing about 370 mg. of bromine in about 3 cc. of acetic acid is added thereto. The mixture is allowed to stand until the reaction is substantially complete as indicated by decolorization of the solution, and the mixture is poured into a mixture of water and chloroform. The chloroform layer is separated and washed with dilute aqueous sodium bicarbonate solution, then with water and finally evaporated to dryness under reduced pressure. The residual material is recrystallized from ethyl alcohol to produce substantially pure 4-bromo-3,11-diketo-17-(α)-hydroxy-20-acetoxy pregnane; M. P. 150–155° C. (with loss of alcohol of crystallization).

*Example II*

About 1 molecular equivalent of 3,11-diketo-17-(α)-hydroxy-20-propionoxy pregnane is dissolved in a propionic acid-ethylene dichloride solution and reacted with about 1 molecular equivalent of bromine and the product isolated substantially as described in Example I. After recrystallization from methyl alcohol, there is obtained the corresponding 4-bromo-3,11 - diketo-17 - (α)-hydroxy-20-propionoxy pregnane.

Various changes and modifications may be made in my invention as described without departing from the spirit and scope thereof. To the extent that these changes and modifications are within the purview of the annexed claims, they are to be considered as part of my invention.

I claim:

1. The process of preparing 4-bromo-3,11-diketo-17-(α)-hydroxy - 20-acyloxy - pregnanes which comprises reacting together substantially equimolecular proportions of bromine and a 20-substituted 3,11-diketo-17-(α)-hydroxy-pregnane, in which the substituent in the 20-position is a radical selected from the class which consists of benzoyloxy and lower aliphatic carboxylic acyloxy radicals.

2. The process which comprises reacting 3,11-diketo-17-(α)-hydroxy-20-acetoxy pregnane with a substantially equimolecular proportion of bromine to produce 4-bromo-3,11-diketo-17-(α)-hydroxy-20-acetoxy pregnane.

3. The process which comprises reacting 3,11-diketo - 17-(α)-hydroxy-20-propionoxy pregnane with a substantially equimolecular proportion of bromine to produce 4-bromo-3,11-diketo-17-(α)-hydroxy-20-propionoxy pregnane.

4. 20-substituted 4-bromo-3,11 - diketo-17-(α)-hydroxy-pregnanes in which the substituent in the 20-position is a lower aliphatic carboxylic acyloxy radical.

5. 4-bromo-3,11-diketo - 17-(α)-hydroxy - 20-acetoxy-pregnane.

6. 4-bromo-3,11-diketo - 17-(α)-hydroxy - 20-propionoxy pregnane.

LEWIS H. SARETT.

REFERENCES CITED

The following references are of record in the file of this patent:

UNITED STATES PATENTS

| Number | Name | Date |
|---|---|---|
| 2,153,700 | Serini | Apr. 11, 1939 |
| 2,232,730 | Reichstein | Feb. 25, 1941 |
| 2,256,500 | Serini | Sept. 23, 1941 |
| 2,345,711 | Marker | Apr. 4, 1944 |
| 2,403,683 | Reichstein | July 9, 1946 |